United States Patent [19]

Sakashita et al.

[11] Patent Number: 5,519,933
[45] Date of Patent: May 28, 1996

[54] PROCESS FOR MANUFACTURE OF BEARING UNIT

[75] Inventors: Hiroshi Sakashita; Jun Yamashita, both of Nagano, Japan

[73] Assignee: Kabushiki Kaisha Sankyo Seiki Seisakusho, Nagano, Japan

[21] Appl. No.: 197,744

[22] Filed: Feb. 17, 1994

[30] Foreign Application Priority Data

Feb. 18, 1993 [JP] Japan .................................. 5-052880

[51] Int. Cl.⁶ .................................................. H02K 15/14
[52] U.S. Cl. ................... 29/598; 29/523; 310/42; 310/89; 310/90
[58] Field of Search ............................ 29/596, 598, 523; 310/42, 89, 90

[56] References Cited

FOREIGN PATENT DOCUMENTS 57-110823  7/1982  Japan .
63-87154   4/1988  Japan .
63-270918  11/1988 Japan .

*Primary Examiner*—Carl E. Hall
*Attorney, Agent, or Firm*—Sughrue, Mion, Zinn, Macpeak & Seas

[57] ABSTRACT

A method permits the use of a low-cost bearing and by which a bearing unit can be manufactured without requiring lathe turning or any special kind of compression, pressure application, etc., that experiences low loss and which assures high precision in the perpendicularity of the rotating shaft to be supported by the bearing. The process for manufacturing a bearing unit in which bearing that supports a rotating shaft in a freely rotatable manner is secured to mounting member. The process includes at least the following three steps: the first step for providing sizing bar in hole in bearing into which the rotating shaft is to be inserted; the second step for working an end portion of the bearing, thereby forming in an end portion of the hole a small-diameter portion that is equal in size to the outside diameter of the sizing bar; and the third step for securing the bearing to the mounting member.

28 Claims, 9 Drawing Sheets

PROCESS FOR MANUFACTURE OF BEARING UNIT

BACKGROUND OF THE INVENTION

1. Field of the Invention

The present invention relates to a process for the manufacture of a bearing unit that is applicable to rotating electric machinery and the like.

2. Related Art

Figure 23:
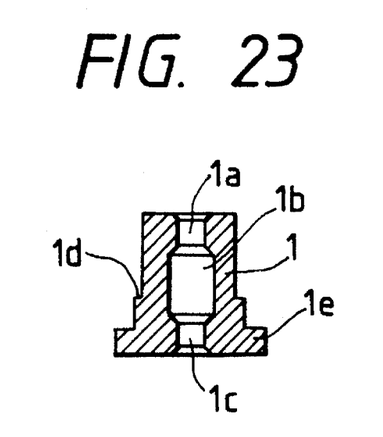
FIG. 23 is a longitudinal section showing a bearing that is used in a prior art bearing unit.
Figure 24:
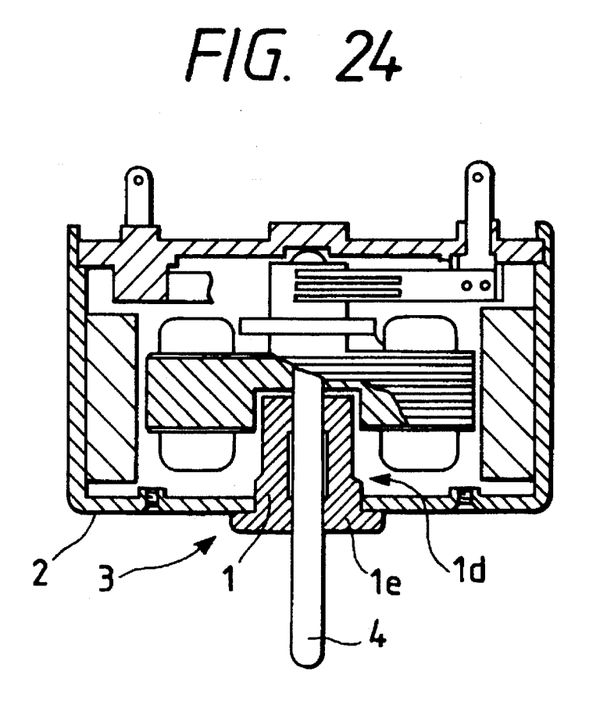
FIG. 24 is a longitudinal section of a prior art bearing unit using the bearing shown in FIG. 23.

A well-known type of bearing unit that is used commonly with rotating electric machinery is constructed so that a bearing that supports the rotating shaft in a freely rotatable manner is secured to a mounting member. FIG. 23 shows an example of the bearing that is used in such a conventional bearing unit, i.e., a sintered oil-retaining bearing; FIG. 24 shows an example of the motor that uses such a bearing.

In FIG. 23, the bearing indicated by 1 has not only a step 1d around the circumference but also a flange 1e on the circumference of one end portion. The diameters of inner peripheral portions 1a and 1c at opposite ends of the bearing 1 are worked to be equal to a specified finishing diameter and the inside diameter of the remaining middle portion 1b is adjusted to be larger than the diameter of the inner peripheral portions 1a and 1c at opposite ends. The difference between the inside diameter of the inner peripheral portions 1a and 1c at opposite ends and the inside diameter of the middle portion 1b is 2 µm and more. The bearing 1 is a sintered oil-retaining bearing that is generally made of a sintered material and the process of its manufacture consists generally of the serial steps of powder compaction, sintering, a second application of pressure, and impregnation with a bearing oil. The difference between the inside diameter of the inner peripheral portions 1a and 1c at opposite ends of the bearing 1 and that of the middle portion 1b may be provided by various methods such as: (1) removing the sintered material from the middle portion by lathe turning; (2) deforming the sintered body by performing a special kind of compression, application of pressure, etc. in the second step of pressure application, and the like.

As shown in FIG. 24, the bearing 1 is secured to a mounting member 2 and a rotating shaft 4 is supported in a freely rotatable manner by means of the bore of the bearing 1. The mounting member 2 is a cup-shaped motor case; the bearing 1 is fitted through a hole in the center of the bottom of the mounting member 2 and the step 1d of the bearing 1 is crimped. The crimped portion and the flange 1e work together to pinch the mounting member 2 in the direction of its thickness, whereby the bearing 1 is secured firmly to the mounting member 2. The bearing 1 and the mounting member 2 form a bearing unit 3. The rotating shaft 4 is supported rotatably by the inner peripheral portions 1a and 1c at opposite ends of the bearing 1; since the middle portion 1b of the bearing 1 does not contact the rotating shaft 4, the advantage of small loss in torque will result.

The above-described prior art bearing unit has the following problems.

(1) The need to perform lathe turning or a special kind of compression, or pressure application or the like in the manufacture of the bearing 1 increases its cost.

(2) The precision in fixing the bearing 1 or the parts precision of the bearing 1 and the mounting member 2 affect the precision in perpendicularity of the bearing 1 to the mounting member 2 in an adverse way.

(3) Since the bearing 1 is generally made of a sintered material, the impregnated bearing oil may potentially leak out of oil holes in the circumference of the bearing 1 under the outward circumferential pressure exerted by the rotating shaft in action; to prevent this trouble, the oil holes in the circumference at the back of the face of the bearing 1 that supports the rotating shaft must be closed in a separate step but then the overall manufacturing process becomes complicated.

SUMMARY OF THE INVENTION

The present invention has been accomplished under these circumstances of the prior art and has as an object providing a process that enables the manufacture of a bearing unit that permits the use of a low-cost bearing requiring no lathe turning or any special kind of compression, pressure application or the like, that experiences low loss and that assures high precision in the perpendicularity of the rotating shaft to be supported.

According to an aspect to the present invention, there is provided a method for manufacturing a bearing unit in which a bearing that supports a rotating shaft in a freely rotatable manner is secured to a mounting member, the method comprising the steps of: providing a sizing bar in a hole in the bearing into which the rotating shaft is to be inserted; working under pressure an end portion of the bearing, thereby forming in an end portion of the hole a small-diameter portion that is substantially equal in size to the outside diameter of the sizing bar; and securing the bearing to the mounting member.

According to the present invention, a sizing bar is provided in a hole in a bearing into which a rotating shaft is to be inserted and an end portion of the bearing is worked under pressure to form a small-diameter portion in an end portion of said hole that is equal in size to the outside diameter of the sizing bar. Therefore, the need to perform lathe turning or a special kind of compression, pressure application, etc. for supporting the rotating shaft solely by the small-diameter portion at an end of the bearing is eliminated and, at the same time, the bearing of low cost is employed; yet, one can manufacture a bearing unit that will experience only small mechanical loss. In addition, the small-diameter portion at an end of the bearing which supports the rotating shaft is shaped in conformity with the outside diameter of the sizing bar which has been finished in high precision and this contributes the advantage of improving the degree by which the rotating shaft to be supported by the bearing is perpendicular to the reference plane. Furthermore, the oil holes present in the end portion of the bearing which is to support the rotating shaft are closed by working under pressure and this effectively prevents the bearing oil from leaking out of the bearing unit under the pressure exerted upon the bearing oil by the rotating shaft in action.

DESCRIPTION OF THE PREFERRED EMBODIMENTS

Several embodiments of the present invention which relates to the process for the manufacture of the improved bearing unit are described below with reference to accompanying drawings.

First embodiment

Figure 1:
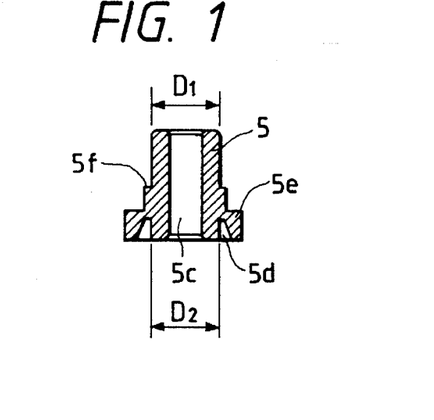
FIG. 1 is a longitudinal section of a bearing that can be used when implementing the process of the present invention.
Figure 2:
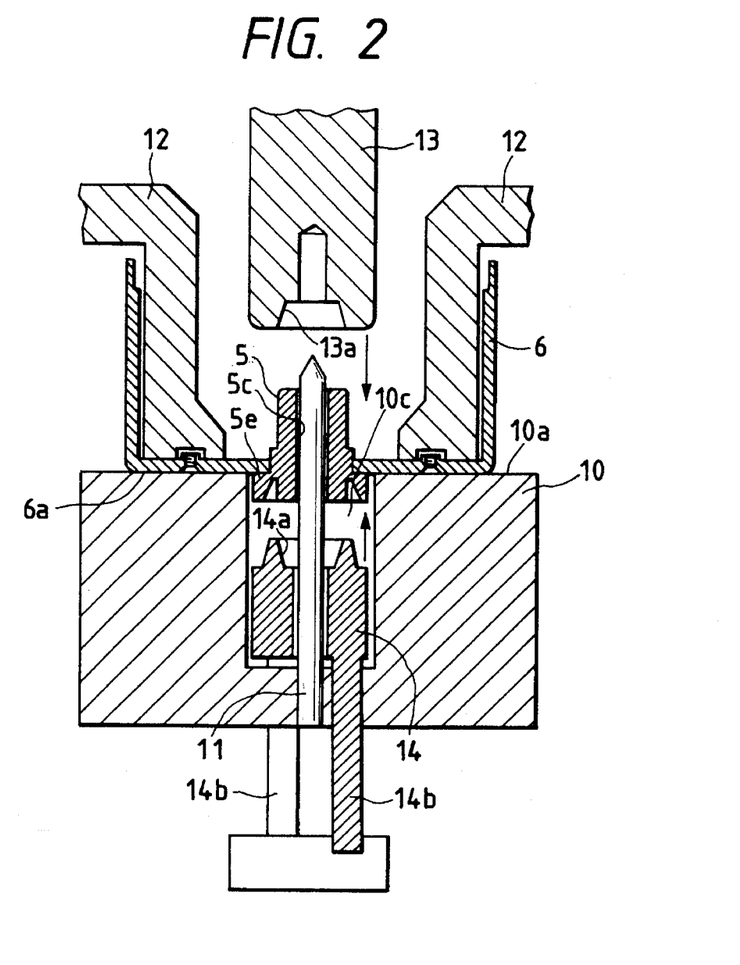
FIG. 2 is a longitudinal section illustrating the first embodiment of the present invention as it uses the bearing shown in FIG. 1.
Figure 3:
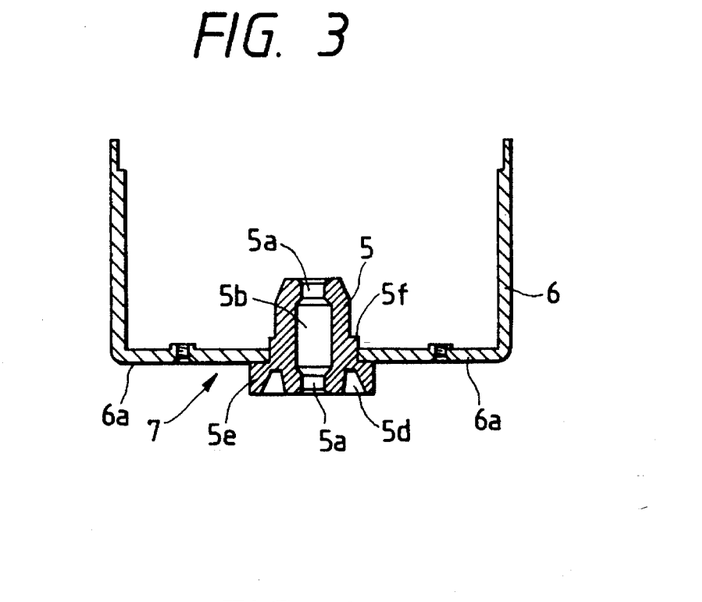
FIG. 3 is a longitudinal section of a bearing unit that is manufactured by implementing the process of the present invention according to its first embodiment.

To begin with, the first embodiment shown in FIGS. 1 to 3 is described. In FIG. 1, the bearing indicated by 5 has a hole 5c through which a rotating shaft is to be inserted. The hole 5c defines a single cylindrical surface and has a specified inside diameter in every part that is larger than the outside diameter of the rotating shaft by a small degree, say, about 2 μm. A flange 5e is formed in one end portion of the outer circumference of the bearing 5 and a step 5f is formed in the middle portion of the outer circumference of the bearing 5. The bearing 5 also has a groove 5d formed in the end face of the side where the flange 5e is formed and this groove runs along a circle that centers on the longitudinal axis through the center of the bearing 5. The inside diameter $D_2$ of the groove 5d is generally equal to the outside diameter $D_1$ of the other end portion of the bearing 5.

The bearing 5 is secured to a mounting member 6 as shown in FIG. 3, thereby constructing a bearing unit 7. The process for manufacturing the bearing unit 7 is illustrated in FIG. 2. With reference to FIG. 2, the mounting member 6 is a cup-shaped member that may typically be used as a motor case; the bearing 5 is fitted from outside the bottom of the mounting member 6 into a hole made in the center of said bottom and the step 5f is crimped as the flange 5e makes contact with the bottom face 6a of the mounting member 6, whereby the crimped portion and the flange 5e work together to pinch the mounting member 6 so that the bearing 5 is secured firmly to the mounting member 6. The mounting member 6 has its bottom face 6a rest on the top face 10a of the base 10 of a bearing's inside diameter finishing device and a press member 12 is depressed against the bottom of the mounting member 6 from inside the latter, whereby the mounting member 6 is properly positioned on the top face 10a of the base 10. A relief hole 10c is formed in the upper central part of the base 10 for receiving the flange 5e of the bearing 5. A sizing bar 11 is fixed in the central part of the base 10. The sizing bar 11 passes through the center of the relief hole 10c and projects further above the top face 10a of the base 10. The sizing bar 11 and the top face 10a of the base 10 are finished in such a way as to insure an extremely high precision in their relative perpendicularity.

A cylindrical lower punch 14 is dropped into the relief hole 10c in the base 10 of the bearing's inside diameter finishing device. The lower punch 14 has not only a center hole that provides relief for the sizing bar 11 but also a bank at the top end that has an outwardly tapered face 14a defining a recess that has a generally inverted conical shape. The tapered face 14a is generally concentric with the sizing bar 11. The tapered face 14a has a maximum diameter slightly larger than the inside diameter $D_2$ of the groove 5d in the bearing 5 and a minimum diameter smaller than $D_2$ by a specified amount. A plurality of legs 14b integral with the bottom of the lower punch 14 penetrate the base 10 to extend further below. The bearing's inside diameter finishing device has an upper punch 13 that faces the lower punch 14. The upper punch 13 has a relief hole for the sizing bar 11 and a recess that is formed by an outwardly tapered face 13a having a generally inverted conical shape. The tapered face 13 is concentric with the sizing bar 11. The tapered face 13a has a maximum diameter slightly larger than the outside diameter $D_1$ of the other end portion of the bearing 5 and a minimum diameter smaller than $D_1$ by a specified amount.

The mounting member 6 to which the bearing 5 is secured is positioned on the top face 10a of the base 10 in such a way as to achieve concentricity with the sizing bar 11; the mounting member 6 is depressed under the press member 12, thereby eliminating any separation that may occur between the top face 10a of the base 10 and the bottom face 6a of the mounting member 6. The step of setting up the mounting member 6 in the manner described above may be defined as the step in which the sizing bar 11 is provided in the hole 5c (see FIG. 1) in the bearing 5 through which the rotating shaft is to be inserted; in the present invention, this step is designated as the first step. Subsequent to the first step, the upper and lower punches 13 and 14 are advanced parallel to the central axis of the sizing bar 11 in such a direction that they come closer to each other (namely, in the direction of pinching the bearing 5); as a result, the tapered face 13a of the upper punch 13 contacts the outer periphery of the upper end of the bearing 5 whereas the tapered face 14a of the lower punch 14 contact the inner periphery of the groove 5d in the bearing 5.

By further advancing the two punches 13 and 14, the upper end portion of the bearing 5 and the periphery of the lower end that is inward of the groove 5d are compressed radially inward by the tapered faces 13a and 14a of the upper and lower punches 13 and 14, respectively. Since the bearing 5 is made of a sintered material, both end portions of it are deformed under the compressive force, whereby the inside diameter of the hole 5c is slightly reduced in both end portions. On the other hand, the sizing bar 11 as inserted into the hole 5c limits the inside diameter of the bearing 5 in both end portions, so that the inside diameter of either end portion of the bearing 5 becomes equal to the outside diameter of the sizing bar 11. The bearing unit thus constructed is illustrated in FIG. 3 by reference numeral 7. Obviously, with both end portions of the bearing 5 having been worked under pressure in the manner described above, the inside diameter of each end portions 5a of the hole in the bearing 5 is equal to the outside diameter of the sizing bar 11 whereas the inside diameter of the middle portion 5b between the two end portions 5a is slightly larger than the inside diameter of 5a.

As already mentioned with reference to FIG. 24, the bearing unit 7 is useful on rotating shafts such as the one of a motor. Since the outside diameter of the sizing bar 11 is equal to that of the rotating shaft, the latter is supported rotatably solely by means of both end portions of the bearing 5 which have been worked to have an outside diameter equal to that of the sizing bar 11 whereas the middle portion 5b makes no contact with the rotating shaft; hence, the bearing unit under consideration has the advantage of experiencing no mechanical loss.

Thus, according to the first embodiment shown in FIGS. 1 to 3, the bearing 5 is secured to the mounting member 6 and the sizing bar 11 is positioned in the hole 5c in the bearing 5 through which the rotating shaft is to be inserted and, further, both end portions of the bearing 5 are worked under pressure to form the small-diameter portion 5a in both end portions of the hole 5c that is equal in size to the outside diameter of the sizing bar 11. As a result, the need to perform lathe turning or a special kind of compression, pressure application, etc. for supporting the rotating shaft solely in both end portions of the bearing 5 is eliminated and, at the same time, the bearing of low cost is employed; yet, the rotating shaft can be supported rotatably solely by means of the small-diameter portions 5a and one can manufacture the bearing unit 7 that will experience only small mechanical loss.

In addition, the small-diameter portions 5a at opposite ends of the bearing 5 which supports the rotating shaft are shaped in conformity with the outside diameter of the sizing bar 11 and the top face 10a of the base 10 against which the bottom face 6a of the mounting member 6 is to be urged and the sizing bar 11 are finished to provide high precision in their relative perpendicularity.

Another advantage that is worth mentioning is that the relative perpendicularity of the rotating shaft which is to be supported by the bearing and the bottom surface 6a of the mounting member 6 which provides the plane for mounting a motor and the like is improved.

Furthermore, the circumference of opposite end portions of the bearing 5 which is to support the rotating shaft is compressively shaped by the upper and lower punches 13 and 14 to close the oil holes present in that circumference; this effectively prevents the bearing oil from leaking out of the bearing unit under the pressure that is exerted upon the bearing oil by the rotating shaft in action. The density of the sintered metal power in the areas that have been worked under pressure is sufficiently increased to suppress the wear that will develop due to the rotating shaft in action; on the other hand, the necessary amount of bearing oil will be supplied through the high-porosity central portion of the bearing. This lends itself to a prolonged service life of the bearing unit.

For the purpose of the present discussion, let the second step of the manufacturing process of the present invention be defined as the step for working both end portions of the bearing 5 under pressure to form the small-diameter portion 5a in each end portion of the hole 5c which is equal in size to the outside diameter of the sizing bar 11 and also let the third step be defined as the step for securing the bearing 5 to the mounting member 6. In the first embodiment under discussion, the third step is first conducted and, then, the first step is done, followed by the second step which is performed lastly.

Figure 4:
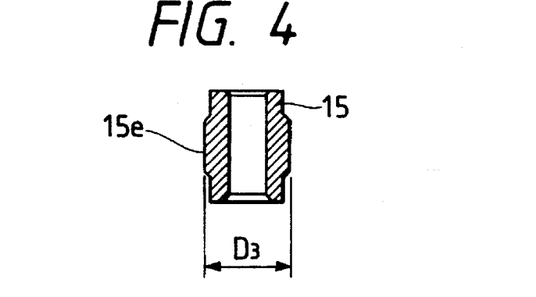
FIG. 4 is a longitudinal section of another bearing that can be used when implementing the process of the present invention.

In the first embodiment described above, the bearing is secured to the mounting member by crimping but, if desired, the bearing may be secured by being pressed into the mounting member. Shown by 15 in FIG. 4 is a bearing of a type that is suitable for fixation on the mounting member by being pressed into the latter. As shown, the axially central portion 15e of the bearing 15 has an outside diameter $D_3$ which is larger than the outside diameter of either end portion and the bearing is to be secured by pressing this large-diameter central portion 15e into the hole in the mounting member. To increase the area over which the bearing 15 is to be pressed into the mounting member, the hole in the latter is desirably formed in a cylindrical shape by burring or some other suitable working process. The inside diameter of either end portion may be finished by the same method as adopted in the first embodiment.

In the first embodiment, the inside diameter of either end portion of the bearing 5 is reduced by advancing the upper and lower punches 13 and 14 with a tapered face in a direction parallel to their longitudinal axis; if desired, the same result can be obtained by moving the punches in a direction perpendicular or at an angle to their longitudinal axis. Alternatively, pressure may be applied with punches that are rotated around the sizing bar 11 or with punches that are equipped with pressure rollers on the inner surface and which are rotated around the sizing bar 11.

It should be added that there is no need to reduce the inside diameter of the entire circumference of either end portion of the bearing; on the condition that the practical use of the bearing should not be prevented, the inside diameter in several parts (say, three parts) may be reduced until it becomes equal to the outside diameter of the sizing bar whereas the diameter of the remaining part is left slightly larger than that of the sizing bar. In the first embodiment, the groove 5d is provided in one end face of the bearing 5 in a manner concentric with its longitudinal central axis. It should, however, be noted that since the purpose of the groove 5d is simply to insure that the bearing 5 will easily deform under pressure, it is not absolutely necessary to provide the groove d if the bearing 5 is already easy to deform. On the other hand, the groove 5d may be provided in both end portions as required. If a groove is provided at all, it may have any desired cross-sectional shape.

Second embodiment

We next describe the second embodiment of the present invention with reference to FIGS. 5 to 8. A bearing indicated by 25 in FIG. 5 has a hole 25c through which the rotating shaft is to be inserted. In every part of it, the bore of this hole has the same inside diameter which is larger than the finishing diameter by about 2 μm or more, and the bearing 25 also has the same outside diameter in every part. Using such bearing 25, one can manufacture a bearing unit by the following procedure.

Figure 6:
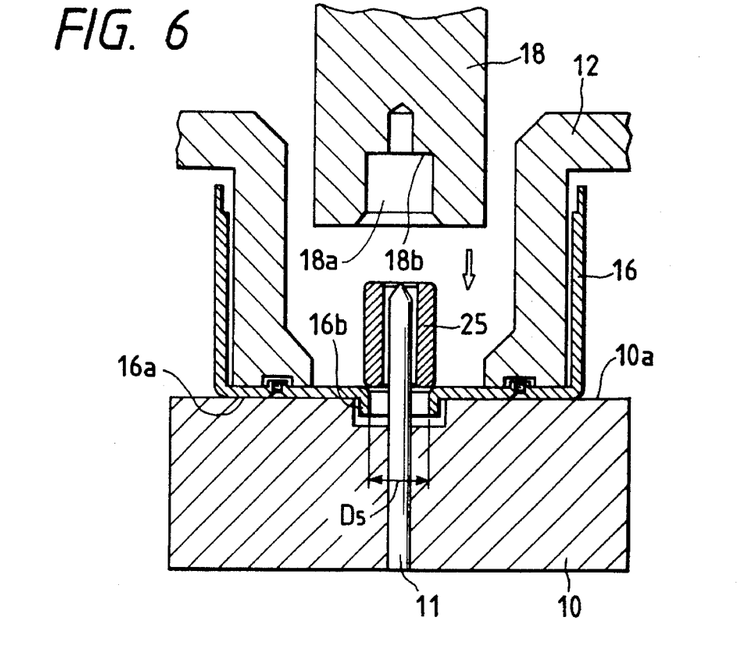
FIG. 6 is a longitudinal section illustrating a process step in the second embodiment of the present invention as it uses the bearing shown in FIG. 5.

First, place a cup-shaped mounting member 16 on the base 10 of a bearing's inside diameter finishing device in such a way that the bottom face 16a of the member 16 contacts the top face 10a of the base 10 as shown in FIG. 6. The mounting member 16 has a cylindrical portion 16b formed in the center of its bottom by burring or some other suitable working process. A sizing bar 11 is loosely fitted through the cylindrical portion 16b. As in the first embodiment, the inner surface at the bottom of the mounting member 16 is depressed with a press member 12, whereby the bottom face 16a which is the reference plane of the mounting member 16 is urged against the top face 10a which is the reference plane of the base 10, so that the mounting member 16 will be properly positioned to be concentric with the sizing bar 11.

The upper end portion of the sizing bar 11 is inserted into the hole 25c in the bearing 25. The bearing 25 is so shaped that its outside diameter $D_4$ is slightly larger than the inside diameter $D_5$ of the cylindrical portion 16b of the mounting member 16 (see FIGS. 5 and 6). Hence, the bearing 25 is unable to be fitted into the cylindrical portion 16b but it rests on the latter. Therefore, in the next step, a press-in punch 18 is lowered to depress the bearing 25 downward. The press-in punch 18 has a hole 18a for receiving both the upper end portion of the sizing bar 11 and the bearing 25, with a stepped shoulder 18b lying on the border between the area for receiving the upper end portion of the sizing bar 11 and the area for receiving the bearing 25. As the press-in punch 18 is lowered, the shoulder 18b depresses the upper end of the bearing 25 and its lower end portion is pressed into the cylindrical portion 16b of the mounting member 16, whereby the bearing 25 is secured to the latter. Since the relationship $D_4 > D_5$ holds, the step of pressing the lower end portion of the bearing 25 into the cylindrical portion 16b causes the pressed portion to decrease in both outside and inside diameters until its inside diameter becomes equal to the outside diameter of the sizing bar 11.

Figure 7:
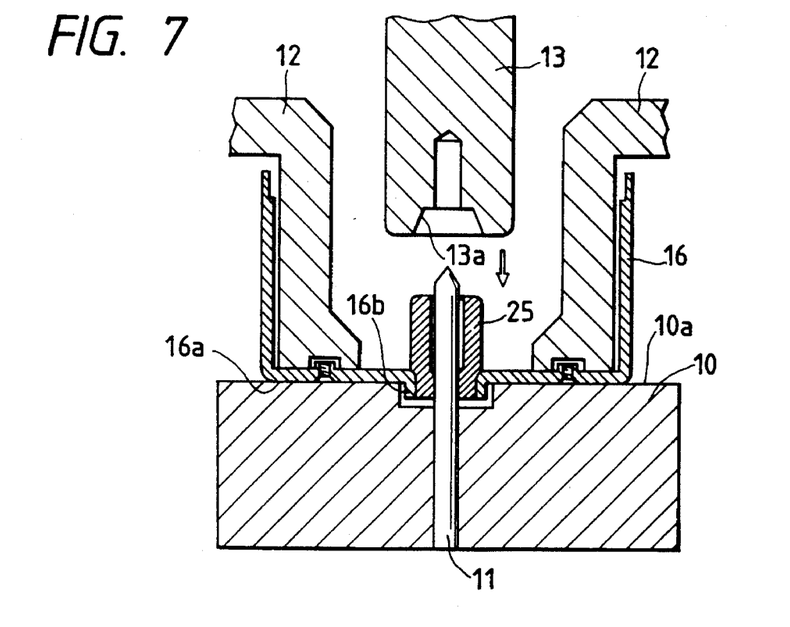
FIG. 7 is a longitudinal section illustrating a subsequent process step in the second embodiment of the present invention.
Figure 8:
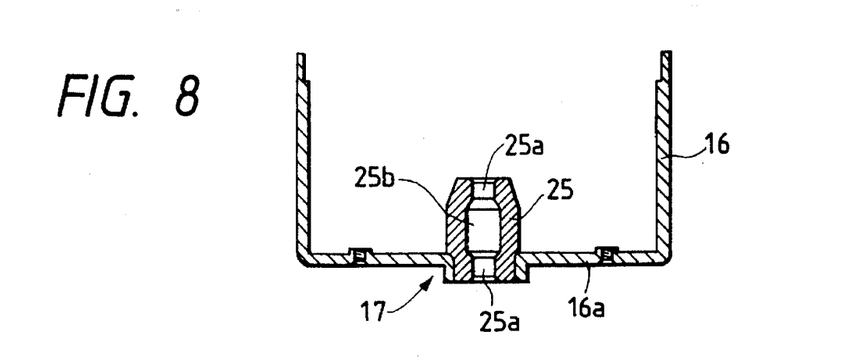
FIG. 8 is a longitudinal section of a bearing unit that is manufactured by implementing the process of the present invention according to its second embodiment.

Subsequently, an upper punch 13 is lowered in place of the press-in punch 18 as shown in FIG. 7. As mentioned in connection with the first embodiment, the upper punch 13 has a recess with the outwardly tapered face 13a, which also constricts under pressure the upper end portion of the bearing 25 until its inside diameter becomes equal to the outside diameter of the sizing bar 11. This process completes the manufacture of a bearing unit as generally indicated by 17 in FIG. 8. The bearing 25 in the bearing unit 17 is such that the small-diameter portions 25a at the upper and lower ends are shaped to have the same inside diameter as the outside diameter of the sizing bar 11 which is equal to the inside diameter of the rotating shaft whereas it does not contact the middle large-diameter portion 25b. Hence, as in the first embodiment, one finds it easy to produce the bearing unit which employs the bearing 25 that does not require any special working process and which yet will experience smaller mechanical loss. Furthermore, as in the first embodiment, the oil holes in the outer circumference of either end portion of the bearing 25 are effectively closed by compression to prevent the leakage of bearing oil; at the same time, the bearing unit produced has satisfactory precision in the perpendicularity of the rotating shaft receiving hole in the bearing 25 with respect to the mounting member 16.

In the second embodiment described above, the third step for securing the bearing 25 to the mounting member 16 is performed simultaneously with the second step in which the small-diameter portion equal in size to the outside diameter of the sizing bar 11 is formed in one end portion of the bearing 25, and this offers the advantage of a simplified overall manufacturing process.

Third embodiment

Figure 9:
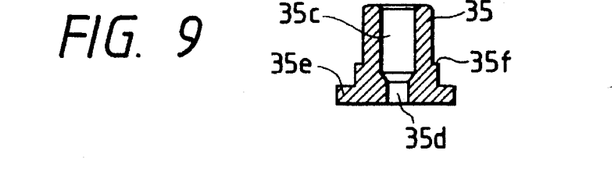
FIG. 9 is a longitudinal section of still another bearing that can be used when implementing the process of the present invention.
Figure 10:
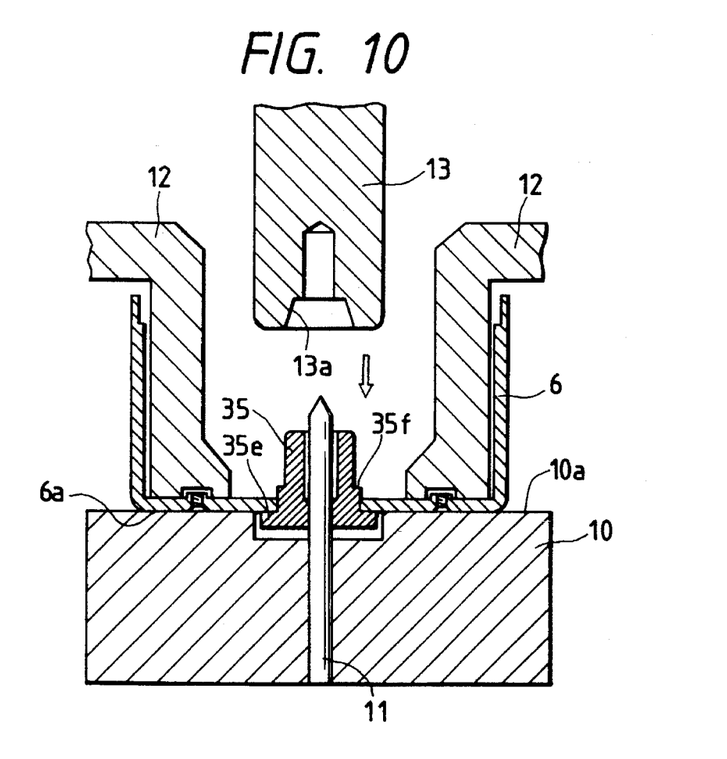
FIG. 10 is a longitudinal section illustrating the third embodiment of the present invention as it uses the bearing shown in FIG. 9.
Figure 11:
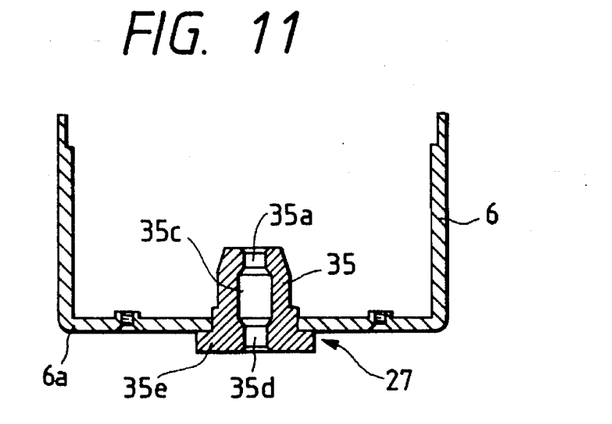
FIG. 11 is a longitudinal section of a bearing unit that is manufactured by implementing the process of the present invention according to its third embodiment.

We next describe the third embodiment of the present invention with reference to FIGS. 9 to 11. The bearing to be employed in the third embodiment is shown by reference numeral 35 in FIG. 9. As shown, the bearing 35 has a flange 35e in one end portion, with a step 35f being formed in the middle part. The inner circumference 35d at the end where the flange 35e is formed is worked preliminarily to have a specified finishing diameter, which is equal to the outside diameter of the rotating shaft to be supported by the bearing 35; the inner circumference 35c of the remaining part is worked to be larger than 35d by about 2 μm or more.

As shown in FIG. 10, the bearing 35 is first secured to the center of the bottom of a cup-shaped mounting member 6 by crimping; thereafter, the mounting member 6 is placed on the base 10 in such a way that its bottom face 6a is positioned properly on the top face 10a of the base, and it is then depressed with a press member 12. As a result, the sizing bar 11 is inserted and positioned in the hole in the bearing 35 through which the rotating shaft is to be inserted. There is little clearance formed between the inner circumference 35d at one end of the bearing 35 and the outside diameter of the sizing bar 11. If the upper punch 13 is lowered in this situation, the upper end portion of the bearing 35 is compressed under the pressure of the tapered face 13a of the punch 13, whereby the inner peripheral surface of the upper end portion of the bearing 35 is finished to have an inside diameter equal to the outside diameter of the sizing bar 11. This process completes the manufacture of a bearing unit that is indicated by 27 in FIG. 11; as shown, the bearing 35 has inner peripheral surfaces 35a and 35b formed at opposite ends which have an inside diameter equal to the outside diameter of the rotating shaft to be supported rotatably by the bearing, and the inner peripheral surface 35c with the larger inside diameter being formed in the middle portion. The third embodiment illustrated in FIGS. 9 to 11 will achieve the same advantages as the already described first and second embodiments.

Figure 12:
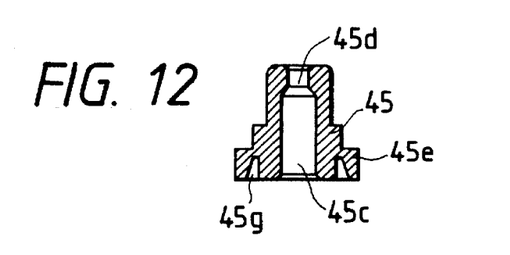
FIG. 12 is a longitudinal section of another bearing that can be used when implementing the process of the present invention.

The bearing to be used in the third embodiment may be of such a type as indicated by 45 in FIG. 12. This bearing has an inner peripheral surface 45d provided in the end portion that is opposite the end where a flange 45e is formed. The surface 45d has a specified finishing diameter. In addition, the bearing 45 has an annular groove 45g formed in the end portion where the flange 45e is formed and this is in order to insure that after the sizing bar is inserted, the tapered surface of the lower punch contacts the bottom of the groove 45g, whereby the end portion where the flange 45 is formed is compressed to facilitate the working of the inner peripheral surface to a specified finishing diameter.

Fourth embodiment

Figure 13:
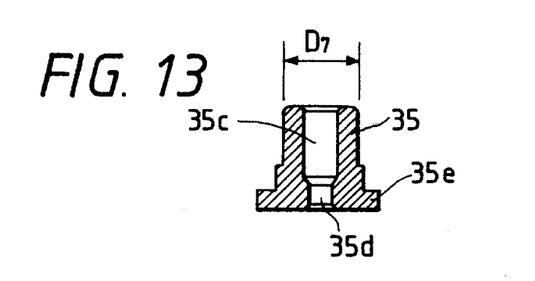
FIG. 13 is a longitudinal section of yet another bearing that can be used when implementing the process of the present invention.
Figures 14A, 14B:
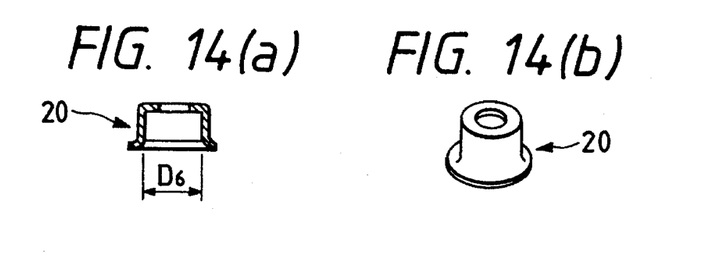
FIG. 14(a) is a longitudinal section of a cap that can be used in the practice of the present invention.
FIG. 14(b) is a perspective view of the cap.
Figure 15:
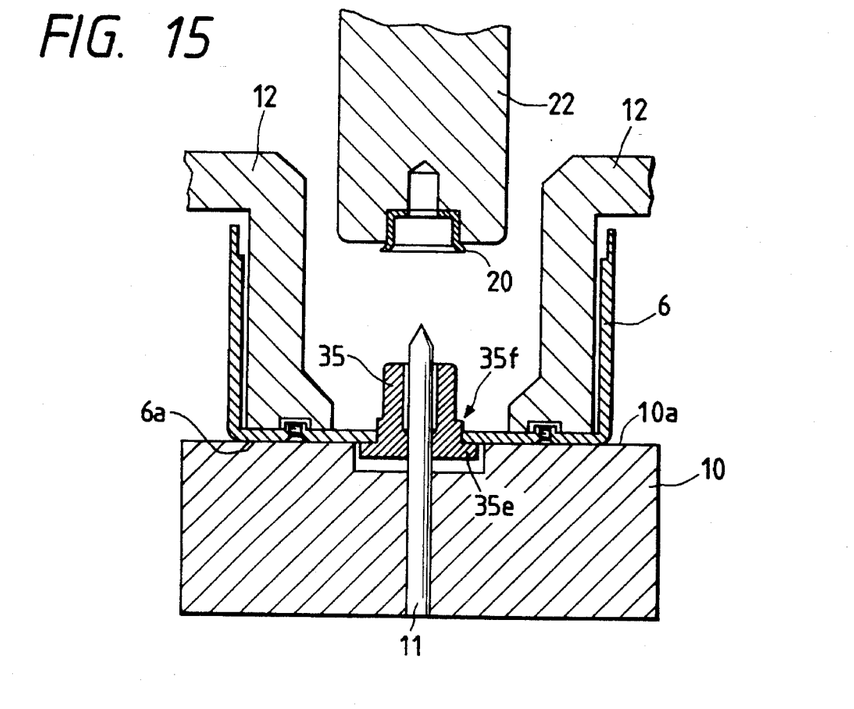
FIG. 15 is a longitudinal section illustrating the fourth embodiment of the present invention as it uses the cap shown in FIG. 14.
Figure 16:
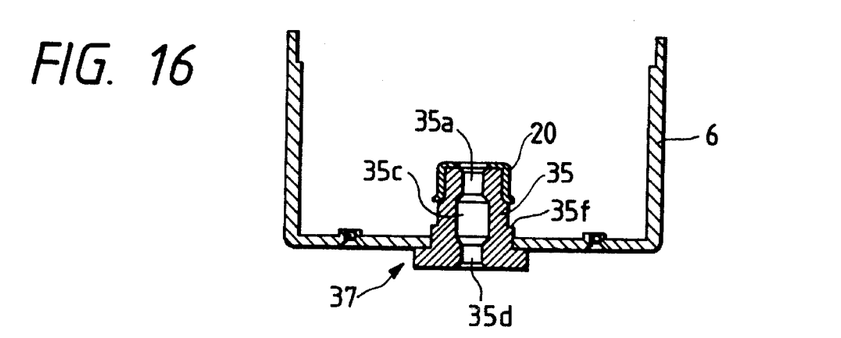
FIG. 16 is a longitudinal section of a bearing unit that is manufactured by implementing the process of the present invention according to its fourth embodiment.

We next describe the fourth embodiment of the present invention with reference to FIGS. 13 to 16. Shown by 35 in FIG. 13 is the bearing to be used in the fourth embodiment, which may be substantially the same as the bearing shown in FIG. 9, except that the outside diameter of the upper end portion is designated by $D_7$. First, the bearing 35 is secured to the bottom of the mounting member 6 by crimping the step 35f as shown in FIG. 15. In the next step, the mounting member 6 is properly positioned on the top face 10a of the base 10 and depressed by a press member 12. As a result, the sizing bar 11 is inserted and positioned in the hole in the bearing 35 through which the rotating shaft is to be inserted. Thereafter, an upper punch 22 is lowered to compress the upper end portion of the bearing 35. It should be noted that in the fourth embodiment, the punch 22 does not compress the upper end portion of the bearing 22 directly but that a cap 20 set in a recess in the lower end portion of the punch 22 is pressed into the upper end portion of the bearing 35 to compress the latter.

The cap 20 is typically formed by pressing a ferrous material and, as shown in FIGS. 14(a) and 14(b), it has a small flange and a relief hole for the rotating shaft. The inside diameter of the cap, $D_6$, is slightly smaller than the outside diameter, $D_7$, of the upper end portion of the bearing 35. Hence, by fitting the cap 20 over the upper end portion of the bearing 35, the latter is compressed and its bore is worked to have a diameter equal to the outside diameter of the sizing bar 11. This process completes the manufacture of a bearing unit that is shown by 37 in FIG. 16. The bearing unit 37 is comparable to the bearing unit 27 shown in FIG. 11 except that it has the cap 20 added thereto.

In the fourth embodiment shown in FIGS. 13 to 16, the bearing 35 as manufactured already has a small-diameter portion on the inner circumference of one end whereas the other end of the bearing is compressed by fitting the cap 20 over said other end. If desired, said one end of the bearing may be compressed by using a punch as shown in FIGS. 2, 6 and 10. It should also be mentioned that the use of the cap 20 as in the fourth embodiment shown in FIGS. 13 to 16 is effective in preventing the bearing oil from leaking out of the bearing unit under the pressure that is exerted by the rotating shaft in action; even if a rotor core such as the one of a motor has a potential to contact the bearing unit, the core will contact the cap 20 but not contact the bearing directly, thereby preventing its rapid wear.

Fifth embodiment

Figure 17:
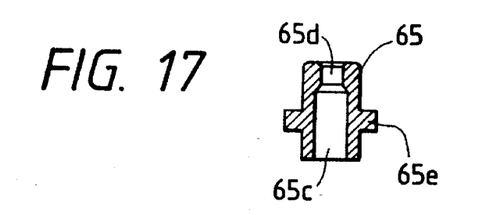
FIG. 17 is a longitudinal section of a still further bearing that can be used when implementing the process of the present invention.
Figure 18:
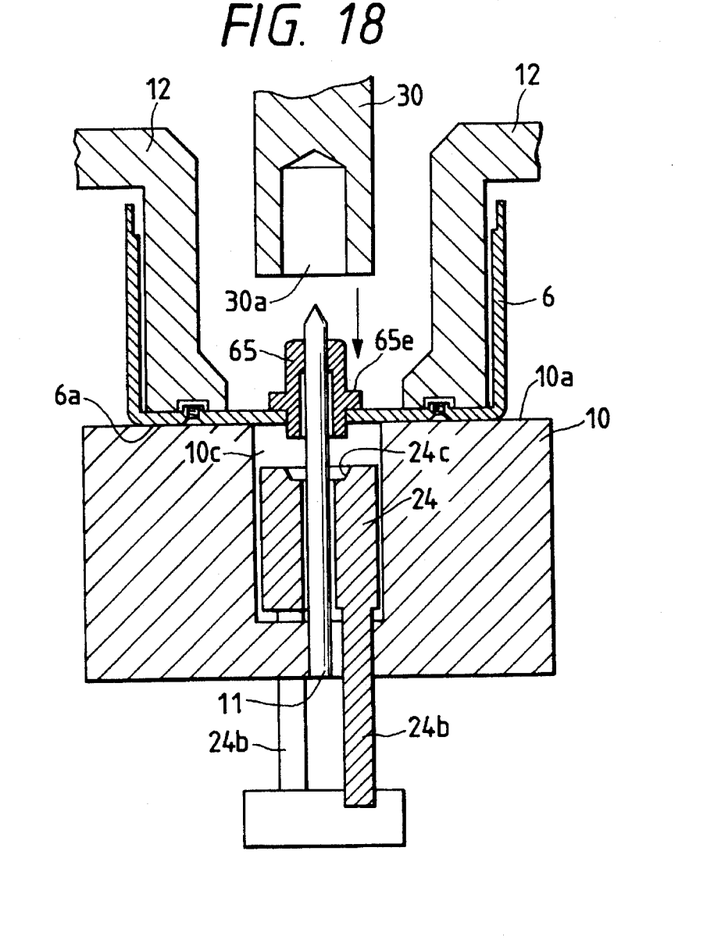
FIG. 18 is a longitudinal section illustrating the fifth embodiment of the present invention as it uses the bearing shown in FIG. 17.
Figure 19:
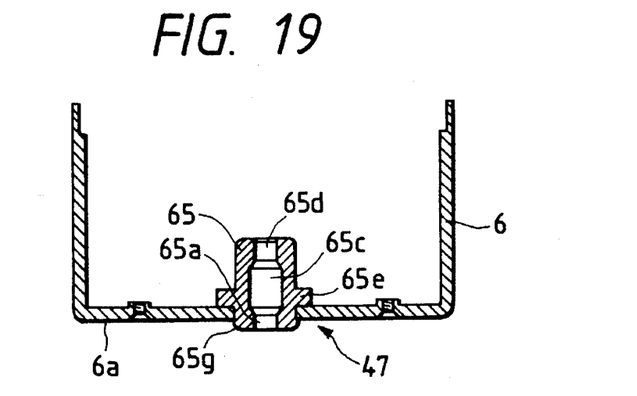
FIG. 19 is a longitudinal section of a bearing unit that is manufactured by implementing the process of the present invention according to its fifth embodiment.

We next describe the fifth embodiment of the present invention with reference to FIGS. 17 to 19. The bearing to be employed in the fifth embodiment is shown by reference numeral 65 in FIG. 17. As shown, the bearing 65 has a flange 65e in the axial middle part and a hole 65c through which the rotating shaft is to be inserted has a small-diameter portion 65d at the upper end that has its inside diameter adjusted to a specified finishing dimension. As shown in FIG. 18, the bearing 65 is inserted from inside into the center hole in the bottom of a cup-shaped mounting member 6. As in the first to fourth embodiments described herein, the mounting member 6 is placed on the base 10 of a bearing's inside diameter finishing device in such a way that its bottom face 6a is positioned properly on the top face 10a of the base. As a result, the sizing bar 11 is positioned in the hole in the bearing 65 through which the rotating shaft is to be inserted. With the respective parts positioned in this way, a depressing punch 30 is lowered to press the flange 65e of the bearing 65 against the inner surface of the bottom of the mounting member 6 while, at the same time, a lower punch 24 is raised to exert pressure on the lower end portion of the bearing 65. The depressing punch 30 has a relief hole 30a for both the bearing 65 and the sizing bar 11. The lower punch 24 has a recess with an outwardly tapered face 24c that exerts pressure on the outer periphery of the lower end of the bearing 65.

As described above, with the flange 65e of the bearing 65 being pressed by the depressing punch 30, the outer periphery of the lower end of the same bearing is pressed by the lower punch 24, whereupon the outer periphery of the lower end of the bearing 65 is crimped to give the result shown in FIG. 19: i.e., the bottom of the mounting member 6 is held between the crimped part 65g and the flange 65e, whereby the bearing 65 is secured to the mounting member 6 to produce a complete bearing unit 47. Further, the pressure exerted by the lower punch 24 on the outer periphery of the lower end of the bearing 65 constricts said outer periphery, thereby forming a small-diameter portion 65a the inner circumference of which has the same diameter as the outside diameter of the sizing bar 11. This small-diameter portion 65a combines with the small-diameter portion 65d at the other end of the bearing 65 to support the rotating shaft in a freely rotatable manner.

The fifth embodiment described above also achieves the same advantages as the first to fourth embodiments already set forth herein. Further, in accordance with the fifth embodiment, the second step for working an end portion of the bearing 65 is performed simultaneously with the third step for securing said bearing 65 to the mounting member 6, and this offers the advantage of a simplified overall manufacturing process.

Figure 20A:
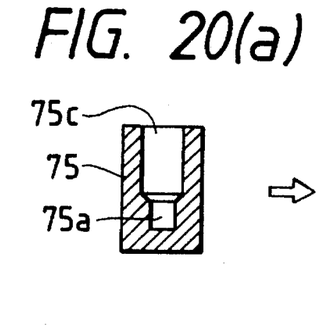
FIG. 20(a) is a longitudinal section showing yet another bearing that can be used in the practice of the present invention.
Figure 20B:
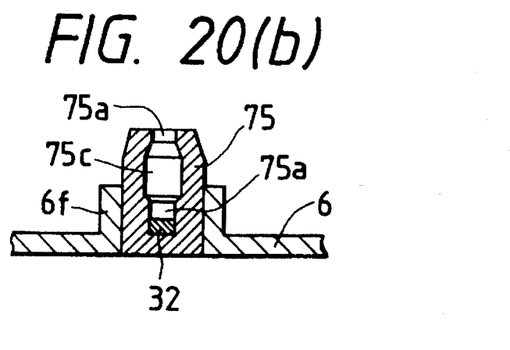
FIG. 20(b) is a longitudinal section of a bearing unit that uses the bearing shown in FIG. 20(a)

All of the bearings described above for use in bearing units have through-holes for insertion of the rotating shaft but they may be replaced by blind holes. FIG. 20 shows an example of the bearing that has a blind hole for insertion of the rotating shaft. The bearing indicated by 75 in FIG. 20(a) has a hole 75c that is closed at an end and into which the rotating shaft is to be inserted. The deepest part of the hole 75c provides a small-diameter portion 75a that has been shaped to have a specified finishing diameter. As shown in FIG. 20(b), the end of the bearing 75 where the small-diameter portion 75a is formed is pressed and fixed in a cylindrical hole that has been formed in the mounting member 6 by burring. The small-diameter portion 75a of the bearing 75 is fitted with a thrust absorber 32. As in the five embodiments described above, the sizing bar is inserted into the hole 75c and, in that state, the open end portion of the hole 75c is worked under pressure to form a small-diameter portion 75a having a specified finishing diameter. After the bearing 75 is worked in this manner, the rotating shaft is inserted so that it is supported rotatably by the small-diameter portion in both end portions, with its load in the thrust direction being carried by the thrust absorber 32.

Figure 5:
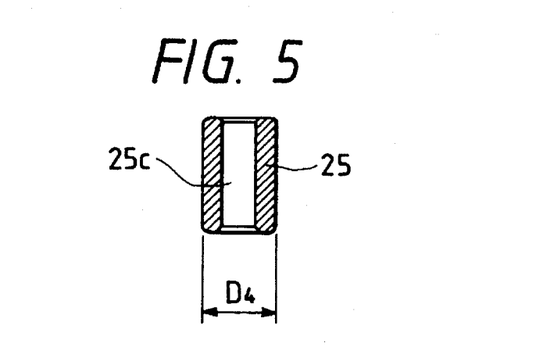
FIG. 5 is a longitudinal section of yet another bearing that can be used when implementing the process of the present invention.
Figure 21A:
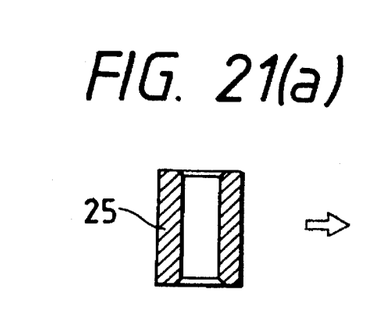
FIG. 21(a) is a longitudinal section showing another bearing that can be used in the practice of the present invention.
Figure 21B:
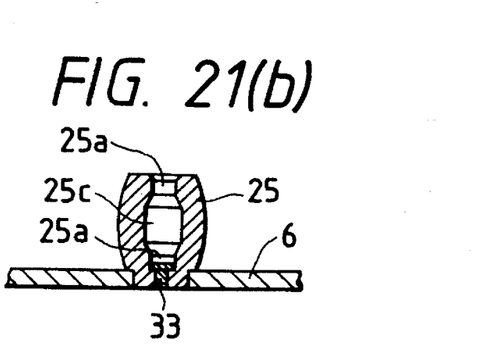
FIG. 21(b) is a longitudinal section of a bearing unit that uses the bearing shown in FIG. 21(a)

The bearing may be so constructed as to form a substantially blind hole even if it is of a cylindrical form as simple as the bearing indicated by 25 in FIG. 5. FIG. 21 shows an example of the use of such simple bearing. The bearing 25 shown in FIG. 21(a) is worked with the aid of a sizing bar to form a small-diameter portion 25a in both end portions that has a specified finishing diameter. Then, as shown in FIG. 21(b), a thrust absorber 33 is buried in one end portion of the bearing which, in turn, is pressed and fixed in the mounting member 6 with said one end portion being further reduced in diameter.

Figure 22A:
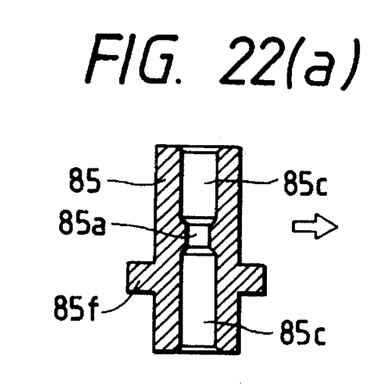
FIG. 22(a) is a longitudinal section showing still another bearing that can be used in the practice of the present invention.
Figure 22B:
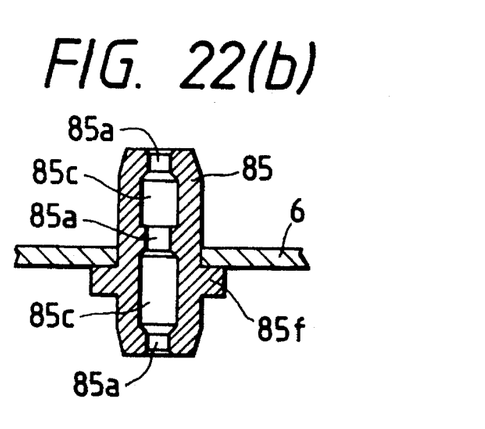
FIG. 22(b) is a longitudinal section of a bearing unit that uses the bearing shown in FIG. 22(a)

By using the process of the present invention, one can manufacture a bearing unit that has a small-diameter portion of a specified finishing diameter formed in three areas of the bore in the bearing and which has a greater-diameter portion between two adjacent small-diameter portions. This bearing unit can be produced without adding any special step to the processes described herein. FIG. 22 shows an example of this preferred case; as shown in FIG. 22(a), the bearing indicated by 85 has a small-diameter potion 85a of a specified finishing diameter in the axial middle part of the bore in the hole through which the rotating shaft is to be inserted; in the next step, a sizing bar is inserted into the hole and both end portions of the bearing 85 are worked under pressure to form small-diameter portions 85a, each having an inside diameter equal to the outside diameter of the sizing bar. As a result, a total of three small-diameter portions 85a are formed in the bore of bearing 85, leaving two larger-diameter hollow portions 85c, each being located between two adjacent small-diameter portions 85a. The bearing 85 has a flange 85f which assists in its fixing to the mounting member 6.

As will be understood from the foregoing description, the first step of the manufacturing process of the present invention in which the sizing bar is inserted into the hole in the bearing for receiving the rotating shaft, the second step in which an end portion of the bearing is worked under pressure to form a small-diameter portion in an end portion of the hole which has an equal inside diameter to the outside diameter of the sizing bar, and the third step for securing the bearing to the mounting member need not be performed in the order written and they may be carried out in other orders. For example, the third step may be followed by the first step which, in turn, is followed by the second step. Alternatively, the second step may proceed simultaneously with the third step. The bearing unit manufactured by the process of the present invention can be used to support the rotating shaft of rotating electric machinery including motors and generators, as well as various other rotating machines.

According to the present invention, a sizing bar is provided in a hole in a bearing into which a rotating shaft is to be inserted and an end portion of the bearing is worked under pressure to form a small-diameter portion in an end portion of said hole that is equal in size to the outside diameter of the sizing bar. Therefore, the need to perform lathe turning or a special kind of compression, pressure application, etc. for supporting the rotating shaft solely by the small-diameter portion at an end of the bearing is eliminated and, at the same time, the bearing of low cost is employed; yet, one can manufacture a bearing unit that will experience only small mechanical loss. In addition, the small-diameter portion at an end of the bearing which supports the rotating shaft is shaped in conformity with the outside diameter of the sizing bar which has been finished in high precision and this contributes the advantage of improving the degree by which the rotating shaft to be supported by the bearing is perpendicular to the reference plane. Furthermore, the oil holes present in the end portion of the bearing which is to support the rotating shaft are closed by working under pressure and this effectively prevents the bearing oil from leaking out of the bearing unit under the pressure exerted upon the bearing oil by the rotating shaft in action.

What is claimed is:

1. A method for manufacturing a bearing unit comprising a bearing having a hole through which a rotatable shaft is inserted and a mounting member to which the bearing is secured, said method comprising the steps of:

providing a base member, a sizing bar protruding from a surface of the base member, a press member, and upper and lower punches;

securing the bearing and the mounting member together;

positioning the mounting member on the surface of the base member so that the sizing bar protrudes through the hole in the bearing;

operating the press member to fix the mounting member against the surface of the base member; and operating the upper and lower punches to work under pressure both end portions of the bearing thereby forming in both end portions a small-diameter portion of the hole, the small-diameter portion being substantially equal in size to an outside diameter of the sizing bar.

2. A method for manufacturing a bearing unit as recited in claim 1, wherein the bearing is a sintered member.

3. A method for manufacturing a bearing unit as recited in claim 1, wherein the mounting member is a cup-shaped motor case.

4. A method for manufacturing a bearing unit as recited in claim 1, wherein the bearing has an annular groove in one end portion of the bearing, and wherein a corresponding one of the upper and lower punches has a tapered face, wherein in said step of operating the upper and lower punches, the tapered face is engaged in the annular groove to compress the one end portion of the bearing radially inwardly.

5. A method for manufacturing a bearing unit as recited in claim 4, wherein a maximum diameter of the tapered face is slightly larger than an inside diameter of the annular groove.

6. A method for manufacturing a bearing unit as recited in claim 4, wherein one of the upper and lower punches has a tapered face, and wherein in said step of operating the upper and lower punches, the tapered face of said one of the upper and lower punches is abutted against one end portion of the bearing to compress the one end portion radially inwardly.

7. A method for manufacturing a bearing unit as recited in claim 6, wherein a maximum diameter of the tapered face is slightly larger than an outer diameter of the one end portion of the bearing.

8. A method for manufacturing a bearing unit comprising a bearing having a hole through which a rotatable shaft is inserted and a mounting member having a cylindrical portion in which the bearing is secured, said method comprising the steps of:

providing a base member, a sizing bar protruding from a surface of the base member, a press member, a press-in punch, and one of an upper punch and a lower punch;

positioning the mounting member on the surface of the base member so that the sizing bar protrudes through the cylindrical hole in the mounting member;

operating the press member to fix the mounting member against the surface of the base member;

positioning the bearing so that the sizing bar protrudes through the hole in the bearing, the bearing having an outside diameter slightly larger than an inside diameter of the cylindrical portion;

operating the press-in punch to press fit the bearing in the cylindrical portion of the mounting member, thereby simultaneously securing the bearing to the mounting member and working under pressure one end portion of the bearing to form a first small-diameter portion of the hole, the first small-diameter portion being substantially equal in size to an outside diameter of the sizing bar; and operating said one of the upper punch and the lower punch to work under pressure an opposite end portion of the bearing to form a second small-diameter portion of the hole, the second small-diameter portion being substantially equal in size to the outside diameter of the sizing bar.

9. A method for manufacturing a bearing unit as recited in claim 8, wherein the bearing is a sintered member.

10. A method for manufacturing a bearing unit as recited in claim 8, wherein the mounting member is a cup-shaped motor case.

11. A method for manufacturing a bearing unit comprising a bearing having a hole through which a rotatable shaft is inserted and a mounting member to which the bearing is secured, a first end portion of the hole having a first small-diameter portion substantially equal to a diameter of the rotatable shaft, said method comprising the steps of:

providing a base member, a sizing bar protruding from a surface of the base member, a press member, and one of an upper punch and a lower punch;

securing the bearing to the mounting member;

positioning the mounting member on the surface of the base member so that the sizing bar protrudes through the hole in the bearing;

operating the press member to fix the mounting member against the surface of the base member;

operating said one of the upper punch and the lower punch to work under pressure a second end portion of the bearing thereby forming in the second end portion a second small-diameter portion of the hole, the second small-diameter portion being substantially equal in size to an outside diameter of the sizing bar.

12. A method for manufacturing a bearing unit as recited in claim 11, wherein the first and second small-diameter portions of the hole are formed so as to be equal in diameter.

13. A method for manufacturing a bearing unit as recited in claim 11, wherein the bearing is a sintered member.

14. A method for manufacturing a bearing unit as recited in claim 11, wherein the mounting member is a cup-shaped motor case.

15. A method for manufacturing a bearing unit as recited in claim 11, wherein the bearing has an annular groove in the second end portion of the bearing, and wherein said one of the upper punch and the lower punch has a tapered face, wherein in said step of operating said one of the upper punch and the lower punch, the tapered face is engaged in the annular groove to compress the second end portion of the bearing radially inwardly.

16. A method for manufacturing a bearing unit as recited in claim 15, wherein a maximum diameter of the tapered face is slightly larger than an inside diameter of the annular groove.

17. A method for manufacturing a bearing unit as recited in claim 11, wherein said one of the upper punch and the lower punch has a tapered face, and wherein in said step of operating said one of the upper punch and the lower punch, the tapered face is abutted against the second end portion of the bearing to compress the second end portion radially inwardly.

18. A method for manufacturing a bearing unit as recited in claim 17, wherein a maximum diameter of the tapered face is slightly larger than an outer diameter of the second end portion of the bearing.

19. A method for manufacturing a bearing unit as recited in claim 11, further comprising the steps of:

setting a cap in a recess in an end portion of said one of the upper punch and the lower punch, an inside diameter of the cap having a diameter that is slightly smaller than an outside diameter of the second end portion of the bearing; and in said step of operating said one of the upper punch and the lower punch, fitting the cap over the second end portion of the bearing to compress the second end portion.

20. A method for manufacturing a bearing unit comprising a bearing having a hole through which a rotatable shaft is inserted and a mounting member to which the bearing is secured, a first end portion of the hole having a first small-diameter portion substantially equal in diameter to a diameter of the rotatable shaft, a flange being provided around an axial middle portion of the bearing, said method comprising the steps of:

providing a base member, a sizing bar protruding from a surface of the base member, a press member, a depressing punch, and one of a lower punch and an upper punch;

securing the bearing to the mounting member so that the flange contacts a surface of the mounting member;

positioning the mounting member on the surface of the base member so that the sizing bar protrudes through the hole in the bearing;

operating the press member to fix the mounting member against the surface of the base member;

operating the depressing punch to press the flange against the surface of the mounting member;

operating said one of the upper punch and the lower punch to work under pressure a second end portion of the bearing thereby forming in the second end portion a second small-diameter portion of the hole, the second small-diameter portion being substantially equal in size to an outside diameter of the sizing bar.

21. A method for manufacturing a bearing unit as recited in claim 20, wherein the hole is a blind hole which extends only partially through the bearing, and wherein in said step of positioning the mounting member, the sizing bar is inserted in the blind hole.

22. A method for manufacturing a bearing unit as recited in claim 11, wherein the hole is a blind hole which extends only partially through the bearing, and wherein in said step of positioning the mounting member, the sizing bar is inserted in the blind hole.

23. A method for manufacturing a bearing unit as recited in claim 8, wherein the hole is a blind hole which extends only partially through the bearing, and wherein in said step of positioning the mounting member, the sizing bar is inserted in the blind hole.

24. A method for manufacturing a bearing unit as recited in claim 1, wherein the hole is a blind hole which extends only partially through the bearing, and wherein in said step of positioning the mounting member, the sizing bar is inserted in the blind hole.

25. A method for manufacturing a bearing unit as recited in claim 1, comprising a step of pre-forming a third small-diameter portion of the hole between the end portions of the bearing.

26. A method for manufacturing a bearing unit as recited in claim 8, comprising a step of pre-forming a third small-diameter portion of the hole between the end portions of the bearing.

27. A method for manufacturing a bearing unit as recited in claim 11, comprising a step of pre-forming a third small-diameter portion of the hole between the end portions of the bearing.

28. A method for manufacturing a bearing unit as recited in claim 20, comprising a step of pre-forming a third small-diameter portion of the hole between the end portions of the bearing.

* * * * *